Oct. 31, 1961    W. W. KLEIN, JR., ET AL    3,006,713
SEISMIC DATA DISPLAY

Filed Oct. 1, 1956     4 Sheets-Sheet 1

INVENTORS
WALTER W. KLEIN, JR.
OKE A. FREDRIKSSON
BY
ATTORNEYS

Oct. 31, 1961 W. W. KLEIN, JR., ET AL 3,006,713
SEISMIC DATA DISPLAY
Filed Oct. 1, 1956 4 Sheets-Sheet 2

INVENTORS
WALTER W. KLEIN, JR.
OKE A. FREDRIKSSON
BY
ATTORNEYS

Oct. 31, 1961  W. W. KLEIN, JR., ET AL  3,006,713
SEISMIC DATA DISPLAY
Filed Oct. 1, 1956  4 Sheets-Sheet 4

INVENTORS
WALTER W. KLEIN, JR.
OKE A. FREDRIKSSON
BY
ATTORNEYS

United States Patent Office 3,006,713
Patented Oct. 31, 1961

---

3,006,713
SEISMIC DATA DISPLAY
Walter W. Klein, Jr., and Oke A. Fredriksson, Fullerton, Calif., assignors to California Research Corporation, San Francisco, Calif., a corporation of Delaware
Filed Oct. 1, 1956, Ser. No. 613,121
2 Claims. (Cl. 346—108)

The present invention relates in general to seismic prospecting and relates more specifically to methods and apparatus for displaying or presenting the data obtained in such prospecting.

In seismic prospecting, a charge of explosives is detonated in the earth and energy from the explosion is detected by one or more seismic detectors spaced some distance from the explosion point. The outputs of the seismic detectors are then recorded, usually as side by side traces on some recording medium, such as an oscillographic camera or a magnetic recording device. In the conventional seismic record, the traces are presented with amplitudes varying as a function of time, and an effort is made to line up or "pick" peaks common to two or more traces, indicative of the receipt by the different detectors of energy from a common reflecting horizon.

In addition to presenting the seismic detector signals individually or presenting the detector signals from a given explosion, there is considerable interest in the presentation of large quantities of seismic data. The various forms of such presentation include the seismic record section which is manually or mechanically produced and which presents a large number of seismic detector signals plotted on a time or depth basis. In such a mass presentation the geophysicist is looking for subtle trends in the data such as gross features that extend over many records. Such features may be the gradual "legging out" of the events, the gradual disappearance of signals in the noise level and the gradual changes in the total number of events on a record. Such features may be associated with, say, the approaching of a "singing" area, the pinching out of a bed, and the gradual transition from a shaly to a sandy section.

One method of such mass presentation of large quantities of data is the enlargement of the size of the presentation. This enlarged presentation is viewed from a distance to avoid seeing the small detail or individual traces in preference to the over-all trends of the entire display. However, such a large presentation is not particularly satisfactory, owing to its size and the difficulties of analysis. Thus, to retain the advantages of a large size of presentation without necessitating such a large physical size, it is desirable to increase the density of seismic information per unit area of the display so that a large amount of seismic data can be presented on a reasonably sized display.

One of the most suitable forms of such display having an increased information density is the so-called variable density or variable intensity presentation, in which variations in the amplitude of the seismic signal are represented by variations in intensity or density on the display surface. One method available heretofore for producing this type of presentation has been the use of a photographic film having a wide tonal range on which the seismic detector signals were impressed as variations in the intensity of a light to produce shadings on the film corresponding to the amplitude of the signals. This system produced an effective display which ranges from black, corresponding to a maximum amplitude in one direction, to white, corresponding to the maximum in the opposite direction, with varying shades of gray in between. However, the method is subject to the disadvantage that it requires high quality photographic paper to produce the desired tonal range, and further requires considerably more elaborate developing procedures than does the photographic paper conventionally used in seismic cameras.

Broadly, the present invention relates to methods and apparatus for presenting seismic data in the form of a density or intensity presentation without requiring any special photographic paper or special developing techniques. In the present invention the seismic detector signal is utilized to modulate a characteristic of a constant-amplitude wave train in accordance with variations in the amplitude of the detector signal. This modulated characteristic of the constant-amplitude wave train is converted into a series of variable characteristic pulses which are utilized to produce a corresponding series of light pulses. These light pulses are photographed as a function of time to produce a photographic record in which variations in the pulses correspond to variations in the amplitude of the seismic detector signal.

In one form of the present invention the seismic detector signal modulates the frequency of a constant-amplitude wave train and this frequency-modulated wave train is converted into a series of light pulses having a frequency corresponding thereto. These light pulses are photographically recorded as a function of time, so that the frequency of the light pulses on the photographic record corresponds to the amplitude of the seismic detector signal. In a particular embodiment of this frequency modulation method, the light pulses are photographically recorded as constant-amplitude lines having a frequency corresponding to the modulated frequency. The lines corresponding to the maximum positive amplitude are closely spaced, to give the visual appearance of black on the photographic record, and the lines corresponding to the maximum amplitude of the other polarity are widely spaced to give an appearance of white, with varying shades of gray in between, corresponding to intermediate spacings of the lines.

In another form of the present invention, the display is in the form of a series of variable width pulses. These variable width pulses may be produced by modulating the width of each pulse in a constant-amplitude wave or pulse train and utilizing these variable pulse widths to control a light source for producing a series of corresponding light pulses of varying duration. These variable duration light pulses are photographically recorded as a function of time to produce a series of constant-amplitude, variable width lines or marks on the photographic record. In an alternate embodiment of the pulse width modulation display, the pulse width variations are produced optically by varying the width of a wedge of light or a light-transmissive slit in response to variations in the amplitude of the seismic signal, and recording the resultant variations in light transmission.

Objects and advantages of the present invention will be more fully apparent from the following description when read in connection with the accompanying drawings, in which:

FIG. 1 diagrammatically represents apparatus for carrying out the present invention by frequency modulation of the seismic detector signal;

FIGS. 2A, 2B, 2C, and 2D are curves representing the operation of the embodiment of FIG. 1 on a representative signal;

FIG. 3 is a photoreproduction of the display produced by the embodiment of FIG. 1 for a representative input signal;

FIG. 4 diagrammatically represents apparatus for carrying out the present invention by pulse-width modulation, utilizing light pulses of variable duration;

Figure 7:
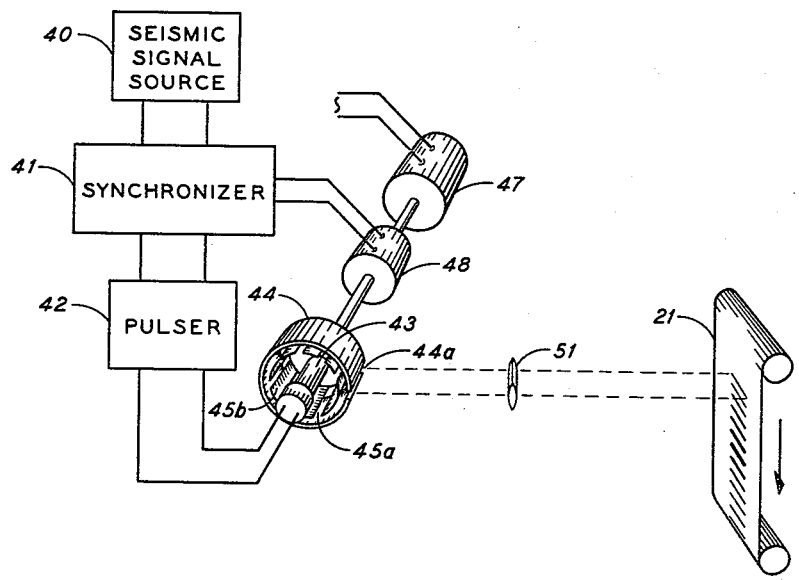
Figure 8:
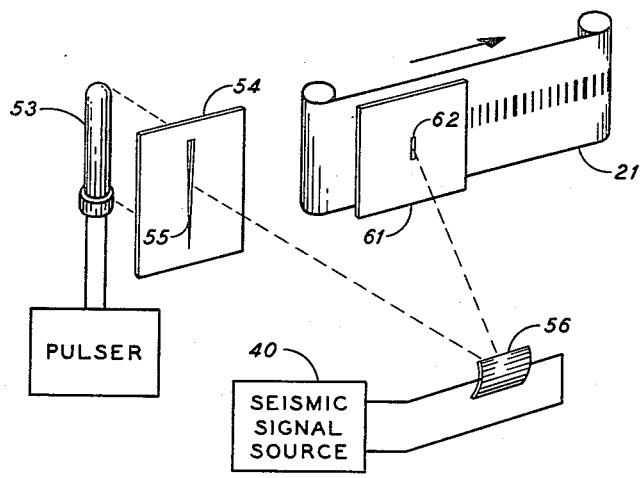

FIG. 7 diagrammatically illustrates an alternate embodiment of the present invention in which a pulse width display is produced by variations in the width of a light-transmissive slit; and FIG. 8 diagrammatically illustrates an alternate embodiment of the present invention in which a pulse width display is produced by variations in the width of a wedge of light.

Figure 1:
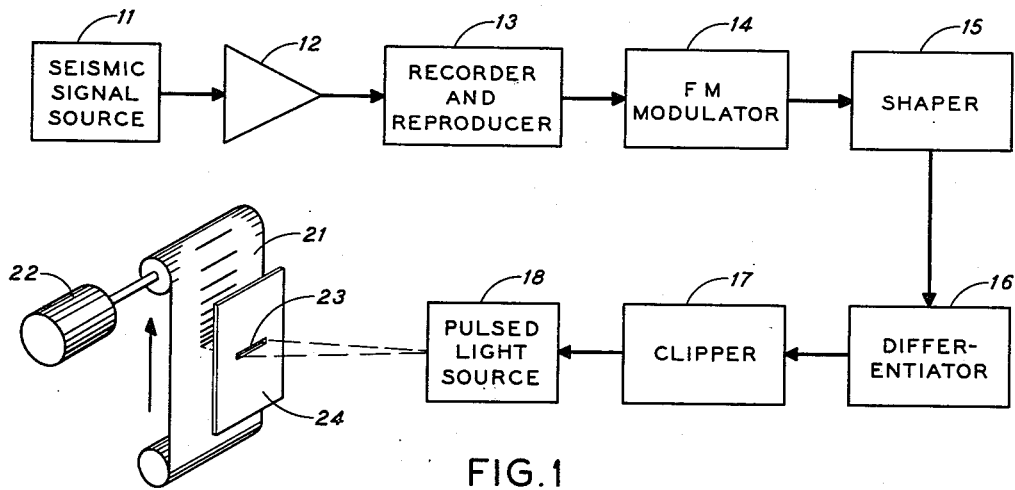

Referring to FIG. 1 by character of reference, numeral 11 designates a device such as a seismic wave detector for producing the seismic signal. The seismic signal from detector 11 is supplied through an amplifier 12 to a suitable recording and reproducing device 13, on which the signal is recorded and from which the signal may be reproduced repeatedly and at will. As is well known in the art, reproducible recording device 13 may be of any suitable type such as a magnetizable medium on which the signal to be recorded is impressed as variations in the magnetization of the recording medium.

In the embodiment of FIG. 1, it is assumed that the seismic signal from detector 11 is first reproducibly recorded on device 13 so that it may be reproduced any number of times, as is desirable in seismic recording. However, it will be apparent that for the purposes of the present invention the seismic detector signal could be utilized directly in the modulation operation without the necessity of first reproducibly recording the signal. Similarly, for simplicity, only one seismic channel has been illustrated, although in practice there will be a considerable number of seismic detectors utilized, and each of such channels can be handled in the manner shown for the single channel of FIG. 1.

The seismic detector signal is reproduced from device 13 and supplied as the modulating input to an FM modulator device 14, where the amplitude of the seismic detector signal modulates the frequency of a constant-amplitude wave train. The output of modulator 14 thus comprises a substantially constant-amplitude wave train having a frequency dependent upon the amplitude of the modulating seismic detector signal. This wave train is supplied to a shaper network 15 where the frequency-modulated wave train is shaped to sharpen the sides of the individual cycles and clip the tops thereof. The output of shaper 15 is supplied to a differentiator 16 which differentiates the signal to produce a pip or spike for each change in direction of the input signal. The output of differentiating device 16 is supplied to a clipper network 17 which eliminates the negative pips or spikes of the frequency modulated wave train, so that the output of clipper network 17 comprises a series of constant-amptitude, constant-width pips or pulses having a frequency determined by the modulation produced by the seismic detector signal.

This series of pulses from clipper network 17 is supplied as the controlling input to a pulsed light source 18, such as a crater lamp. The light output from light source 18 is photographically recorded as a function of time on a photographic medium 21, which is driven by motor 22. The light from light source 18 is projected onto film 21 through a slit 23 in a masking plate 24, so that each light pulse is projected on film 21 in the form of a line. The light pulses supplied to film 21 corresponding to each seismic detector signal are preferably channelized so that the different signals may be recorded on film 21 as adjacent traces, thus facilitating analysis of the mass presentation.

Figure 2A:
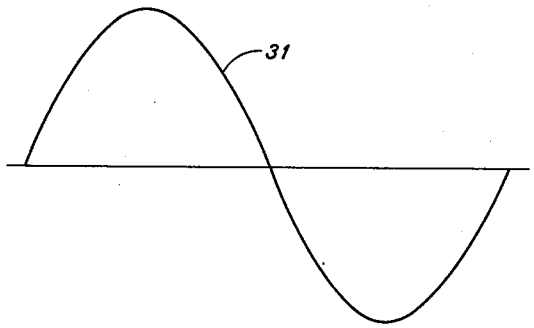
Figure 2B:
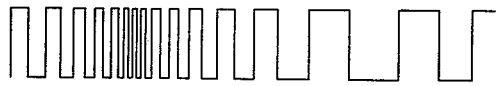
Figure 2C:
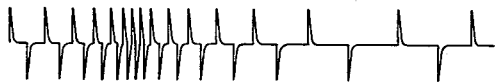
Figure 2D:

The operation of the embodiment of FIG. 1 may be more apparent from the graphs of FIGS. 2A, 2B, 2C, and 2D, which illustrate the operation of this embodiment on a representative signal. In FIG. 2A, curve 31 represents a signal which is to be recorded or displayed in accordance with the present invention. Assuming that a signal corresponding to curve 31 is supplied as the modulating input to FM modulator 14, the output of shaper 15 may appear, as shown in FIG. 2B, as a constant-amplitude wave train having sharpened sides and clipped peaks and having a frequency corresponding to the amplitude of the modulating input of curve 31. In the particular embodiment illustrated in FIG. 2B it is assumed that the maximum frequency of the frequency modulated wave train corresponds to the maximum positive amplitude, although it will be apparent that this relationship could be reversed if desired. The variable frequency wave train is supplied to differentiator 16, which differentiates the wave train to produce, as shown in FIG. 2C, a series of pips corresponding to the changes in direction of the wave train of FIG. 2B. The wave train of FIG. 2C is supplied to clipper 17 where the negative portions thereof are removed to produce at the output of clipper network 17 a series of pulses corresponding to those shown in FIG. 2D. The pulses of FIG. 2D are supplied to light source 18 to produce on film 21 a series of constant-amplitude, constant-width lines having a frequency corresponding to the frequency of the pulses. Thus, the display on film 21 comprises a series of constant-amplitude pulses or lines having spacing or frequencies corresponding to the amplitude of the modulating input signal to produce in effect a variable density display.

The particular frequencies utilized for modulation may vary in dependence upon the frequency of the signal to be displayed. In the display of seismic signals, we have modulated the frequency of a signal having a central or carrier frequency of 1600 cycles per second, and have found this very satisfactory.

Figure 3:

FIG. 3 is a photoreproduction of a single trace of a display utilizing frequency modulating techniques in accordance with the embodiment illustrated in FIG. 1. The trace shown in FIG. 3 was produced by modulating the frequency of a carrier signal having a median or center frequency of 300 cycles per second. The modulating input was a sinusoidal signal having a frequency of 20 cycles per second and having an amplitude of 4 volts R.M.S. It can be clearly seen from FIG. 3 that the variations in the frequency of the photographic lines produced by the frequency modulated pulses serve very well to give the impression of a variable density display. The effectiveness of the display will, of course, be improved by the use of a number of adjacent traces corresponding to a number of different channels, so that common events or reflections on the different traces may be correlated.

The frequency modulating embodiment of FIG. 1 produces a very useful display in which variations in the amplitude of the seismic detector signals appear as variations in the density or intensity on the film. However, the embodiment of FIG. 1 has the disadvantage that the sampling rate varies according to the amplitude of the modulating input signal. Thus, for example, for the frequency range listed above, the sampling rate varies by greater than 4 to 1 from the 700 cycle per second sampling rate at minimum modulation to the 3,000 cycle per second sampling at the maximum modulation.

While this frequency modulation method is very effective in producing a mass presentation display, it is desirable that the sampling rate remain constant for all amplitudes of the seismic signal. To achieve this, the embodiment of FIG. 4 may be utilized, in which the seismic detector signal from detector 11 is supplied as before through amplifier 12 to recording and reproducing device 13. The signal reproduced from device 13 is supplied as the modulating input to a pulse width modulator 37. Pulse width modulator 37 receives a constant frequency input from a master frequency generator 38. The output from pulse width modulator 37 comprises a wave train of constant amplitude pulses having widths determined by the amplitude of the modulating input signal from device 13. This width-modulated pulse train is supplied to pulsed light source 18 to control light source 18 in accordance with widths of the pulses in the pulse train. The output from pulsed light source 18 comprises a series of variable-duration light pulses corresponding to the input pulses, and these light pulses are supplied to film 21 through slit 23 to produce on film 21 a photographic record in the form of a series of constant-amplitude, variable-width lines or marks.

Figure 4:
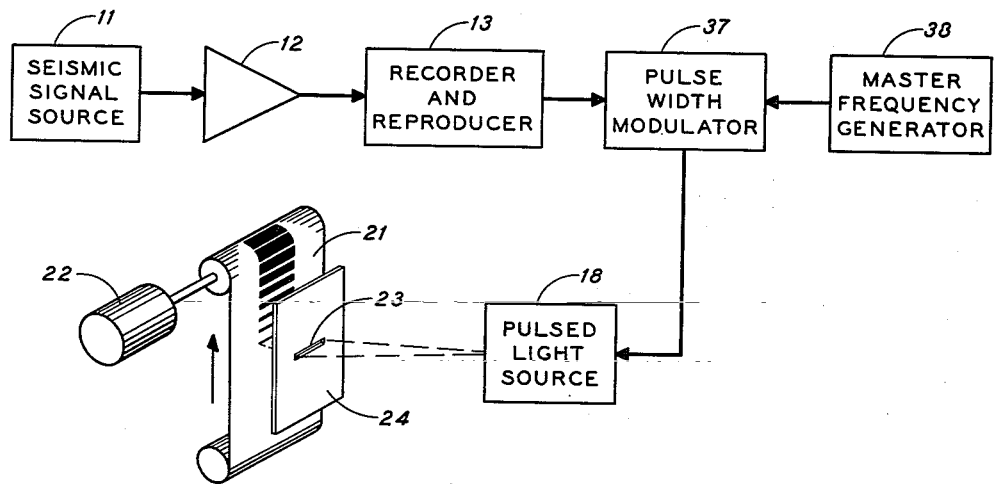
Figure 5A:
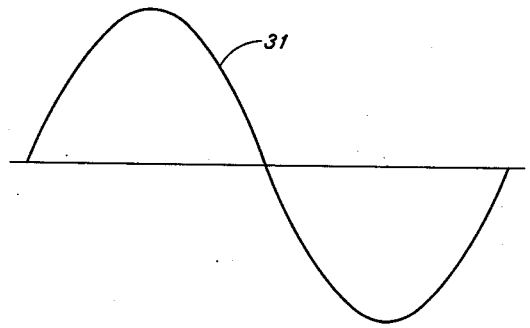
FIGS. 5A and 5B are graphs representing the operation of the embodiment of FIG. 4 on a representative signal.
Figure 5B:

In the embodiment illustrated in FIG. 4, the maximum pulse width occurs at the positive maximum value of the seismic detector signal so that the variable density record on film 21 appears darkest at the positive maximum. Similarly the pulse width is narrowest at the negative maximum so that the record on film 21 appears whitest at these points. FIGS. 5A and 5B illustrate graphically the operation of the embodiment of FIG. 4 on representative signal 31. The master sampling frequency generated by generator 38 may be of any value high enough to produce a representative rate of sampling of the signal. Assuming that it is desired to sample a signal at least 20 times per cycle to attain representative sampling, the output of pulse width modulator 37 would appear, as shown in the graph of FIG. 5B, with twenty pulses occurring during the interval of one cycle of curve 31.

In each of the pulses of FIG. 5B the leading edges thereof are separated by constant amounts, and the duration of the different pulses varies according to the amplitude of the seismic detector signal. Thus a series of variable width pulses corresponding to FIG. 5B is supplied to pulsed light source 18, and this series of pulses controls the duration of illumination from the light source 18 in accordance with the width of the pulse. Thus the record appearing on film 21 comprises a series of constant-amplitude lines having a width varying in dependence upon the amplitude of the seismic detector signal, the widest lines corresponding to positive maximum values and the narrowest lines corresponding to negative maximum values. Thus, in effect, a variable density record is produced on film 21 in which variations in the width of the individual lines thereon give the appearance of variations in the density of the recording.

Figure 6:
FIG. 6 is a photoreproduction of the display produced by the embodiment of FIG. 4 for a representative input signal.

FIG. 6 shows a photoreproduction of a trace produced by pulse width apparatus similar to that shown in FIG. 4. To produce this trace, a modulating sinusoidal signal having a frequency of 15 cycles per second was utilized to modulate the widths of the pulses in a pulse train having a frequency of 500 cycles per second. The resultant trace produces a very effective display of the variable density or intensity type, facilitating the correlation of events across the record.

In the embodiment illustrated in FIG. 4, the pulse width modulation display was produced by varying the duration of photographically recorded light pulses. However, the pulse width display may be produced in any of a number of other suitable ways, one of which is shown in the embodiment of FIG. 7. In FIG. 7, the seismic detector signal from a source 40 is supplied through a synchronizing device 41 to a pulser 42. The output of pulser 42 controls a light source 43 mounted within a pair of concentric cylinders 44 and 45. Inner cylinder 45 is provided around the periphery thereof with a plurality of translucent slits 45a alternately spaced between opaque slits 45b. Outer cylinder 44 is provided with a single translucent slit 44a. Inner cylinder 45 is driven relative to outer cylinder 44 by a drive motor 47. Motor 47 also drives a reference generator 48 which produces an output signal which provides an indication of the rotative position of cylinder 45.

As cylinder 45 rotates within cylinder 44, the transmission of light from light source 43 through slits 45a and 44a varies in dependence upon the position of the particular slit 45a relative to slit 44a. Thus, when light source 43 is pulsed at the instant when one of the slits 45a is aligned with slit 44a, a maximum transmission of light through the cylinders results, to produce a wide beam of light which is focused by a lens 51 on film 21. Similarly, when light source 43 is pulsed at an instant when an opaque section 45b is aligned with 44a, no transmission of light through slit 44a results, and intermediate amounts of light will be transmitted through slit 44a for intermediate positions of slits 45a.

The output signal from reference generator 48, indicating the rotative position of inner cylinder 45, is supplied as an input to synchronizer 41. Synchronizer 41 coordinates the reference signal from reference generator 48 and the seismic detector signal from device 40 to control pulser 42 in such a manner that light source 43 is pulsed at an instant in the rotative cycle of inner cylinder 45 so that the width of the light pulse transmitted through slits 44a and 45a bears a relationship to the amplitude of the seismic detector signal at that instant. Thus, light source 43 is phased with respect to the rotation of cylinder 45, to insure the desired relationship between the instantaneous amplitude of the seismic detector signal and the width of the transmitted light pulse.

For example, if a maximum width pulse corresponds to a maximum positive amplitude of the seismic detector signal, then when the maximum occurs in the seismic detector signal, light source 43 is pulsed at the instant when slits 44a and 45a are aligned to produce maximum transmission of light through slits to thus produce the widest pulse on film 21. Similarly, when the seismic detector signal has a negative maximum value, light source 43 is pulsed at an instant when slit 44a is totally or nearly totally obscured by an opaque portion 45b, resulting in a minimum transmission of light to film 21.

Thus, a record is produced on film 21 in which the width of the pulses thereon bears a relation to the amplitude of the seismic detector signal at that instant so that in effect a variable intensity display is produced. Pulser 42 and rotating cylinder 45 preferably operate at rates which will produce a suitably high sampling rate of the seismic detector signal to insure a representative sampling of each cycle of the seismic detector signal. Although but a single channel display is illustrated, it will be understood that a plurality of such channels are preferably simultaneously operated to produce a multiple channel display. Such a multiple channel display could be produced by utilizing a plurality of separate pulsed light sources 43 within cylinders 44 and 45 each of these light sources being controlled by a different seismic detector signal.

FIG. 8 illustrates an additional embodiment of the pulse width display in which the pulse width variations are produced by varying the width of a wedge of light. In FIG. 8, reference character 53 designates a pulsed light source producing pulses of light at a suitable repetition frequency. The light from pulsed light source 53 is projected onto a mask 54 having a wedge-shaped opening 55 therein through which light is passed. This wedge of light passing through opening 55 is projected onto the mirror 56 of a galvanometer which is energized in accordance with the seismic detector signal from device 40. Mirror 56 reflects the wedge of light toward a masking plate 61 having a slit 62 therein for the transmission of light from mirror 56 to film 21.

As galvanometer mirror 56 rotates in accordance with variations in the amplitude of the seismic detector signal, the wedge-shaped image of light reflected therefrom is projected across slit 62. Since the wedge of light is longer than the slit, only a portion of the light wedge is projected through slit 62 at any one time. Thus the width of the portion of light projected through slit 62 varies in accordance with the width of the portion of the wedge of light which is projected on slit 62 at any instant to produce on film 21 a series of light pulses having widths varying in dependence upon the amplitudes of the seismic detector signal. The height of the wedge of light is preferably large relative to the height of the slit 62 so that the light pulses produced on film 21 have substantially vertical sides. Pulsed light source 53 has a frequency sufficiently high to produce a representative sampling rate for the seismic detector signal and to insure that discrete pulses of light are provided on film 21.

We claim:

1. The method of simulating a variable-density photographic record of seismic detector signals independently of exposure characteristics of the photographic film upon which said record is printed, which comprises the steps of generating a first electrical signal consisting of a train of waves modulated in amplitude in accordance with variations in the amplitude of a seismic detector signal, generating a second electrical signal consisting of a series of constant amplitude electrical pulses, controlling the repetition rate of said series of pulses in said second electrical signal in accordance with said modulation of said first signal, maintaining a constant duration for each of said controlled pulses within said series of pulses, energizing a light source to produce light pulses of substantially constant intensity for each pulse in said controlled second electrical signal, and recording as a function of time a plurality of said light pulses as exposed parallel portions on said photographic record, the variations in total area of said record exposed by said recorded parallel portions corresponding to variations in the amplitude of said seismic detector signal and being independent of the exposure characteristic of said photographic film.

2. The method of simulating a variable-density photographic record of seismic detector signals independently of exposure characteristics of the photographic film upon which said record is printed, which comprises the steps of generating a first electrical signal consisting of a train of waves modulated in amplitude in accordance with variations in the amplitude of a seismic detector signal, generating a second electrical signal consisting of a series of constant amplitude electrical pulses, controlling the duration of each pulse in said series of pulses of said second electrical signal in accordance with said modulation of said first signal, maintaining a constant repetition rate for beginning each pulse in said series of pulses while said pulse duration is varied, energizing a light source to produce a light pulse of substantially constant intensity for each pulse in said controlled electrical signal, and recording as a function of time a plurality of said light pulses as exposed parallel portions on a photographic record, each exposure beginning an equal space interval from the beginning of the preceding parallel exposure to produce said simulated variable-density photographic record independent of the exposure characteristic of said photographic film.

References Cited in the file of this patent

UNITED STATES PATENTS

| | | |
|---|---|---|
| 1,848,839 | Ranger | Mar. 8, 1932 |
| 1,862,327 | Bagno | June 7, 1932 |
| 1,933,267 | Keith | Oct. 31, 1933 |
| 2,304,633 | Farnsworth | Dec. 8, 1942 |
| 2,331,456 | Cox | Oct. 12, 1943 |
| 2,422,140 | Sinnett | June 10, 1947 |
| 2,426,366 | Maurer | Aug. 26, 1947 |
| 2,436,148 | Maurer | Feb. 17, 1948 |
| 2,452,547 | Chatterjea et al. | Nov. 2, 1948 |
| 2,531,494 | Atwood et al. | Nov. 28, 1950 |
| 2,620,890 | Lee et al. | Dec. 9, 1952 |
| 2,726,131 | Skelton | Dec. 6, 1955 |
| 2,767,388 | Rust | Oct. 16, 1956 |
| 2,791,288 | Meier | May 7, 1957 |